United States Patent Office
3,434,873
Patented Mar. 25, 1969

3,434,873
POLYMERIZATION OF PHENOLS ON METALLIC COPPER
John F. Harrod, Saratoga, N.Y., assignor to General Electric Company, a corporation of New York
No Drawing. Filed Aug. 1, 1966, Ser. No. 569,097
Int. Cl. B44d 1/34, 1/36
U.S. Cl. 117—127                                       9 Claims This invention relates to a method of producing an insoluble insulating coating on a copper-containing object. More particularly, this invention relates to a method of curing a phenol on a copper-containing object to yield an insulating coating.

In accordance with the process of this invention, a phenol which is unsubstituted either in the ortho- or para-position is mixed with pyridine or a pyridine derivative in an appropriate solvent and coated onto a copper-containing object. The copper-containing object is then expected to air or an oxygen-containing atmosphere and maintained at a temperature at which the phenol reacts with oxygen to cure to a polymeric insoluble insulating coating on the object.

The particular phenols which I can employ in the process of this invention are those shown in Formula I

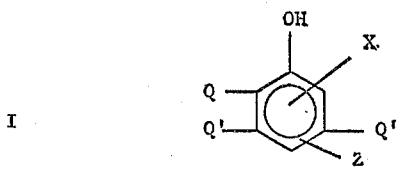

where X is a substituent selected from the group consisting of hydrogen, chlorine, bromine and iodine, Q is a monovalent substituent selected from the group consisting of hydrogen, hydrocarbon radicals, hydrocarbonoxy radicals, halohydrocarbon radicals having at least 2 carbon atoms between the halogen and the phenol nucleus, and halohydrocarbonoxy radicals having at least 2 carbon atoms between the halogen atom and the phenol nucleus, Q' is of the same class of substituents as Q, and in addition, may be halogen, that is, fluorine, chlorine, bromine and iodine. Z is of the same class of substituents as Q and in addition, may be halogen, a group of the formula

II

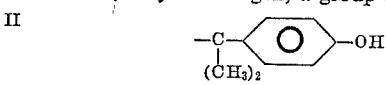

a group of the formula

III

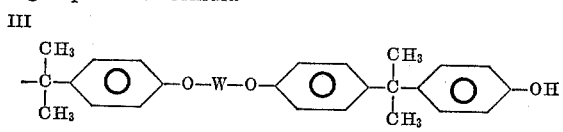

wherein W is a

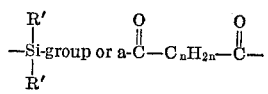

group wherein R' is a monovalent hydrocarbon radical, a halogenated monovalent hydrocarbon radical or a cyanoalkyl group and $n$ is an integer of from 0 to 18, or a silicon-containing moiety having the formula

IV

where $n$ is an integer having a value of from 0 to 18 and each free valence of each silicon atom is interconnected to a member of the class consisting of monovalent hydrocarbon radicals, halogenated monovalent hydrocarbon radicals, cyanoalkyl radicals and oxygen, said oxygen being connected to no other group than a monovalent hydrocarbon radical, a halogenated monovalent hydrocarbon radical or silicon of a siloxane grouping, all other free valences of all silicon atoms being satisfied by monovalent hydrocarbon radicals, halogenated monovalent hydrocarbon radicals and cyanoalkyl groups; all substituents being free of aliphatic unsaturation.

The silicon-containing radicals represented by Z in Formula I are the

V                     

VI                    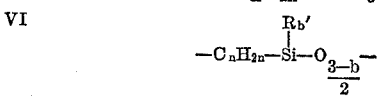

and

VII                   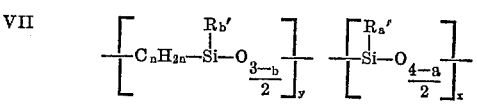

where R' and $n$ are as above-defined and R is a member of the class consisting of monovalent hydrocarbon radicals, halogenated monovalent hydrocarbon radicals, cyanoalkyl groups, monovalent hydrocarbonoxy radicals, monovalent halogenated hydrocarbonoxy radicals and

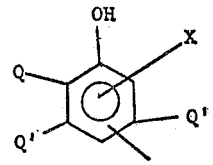

groups where Q, Q', and X have the above-defined meanings, $a$ is an integer having a value of from 1 to 3, $b$ is an integer having a value of from 0 to 2, $x$ is an integer of at least 1, and can be as high as 20,000 or even more and $y$ is an integer of at least 1 and can be as high as 5,000 or even higher.

The monovalent radicals included by R and R' are alkyl groups, aryl groups, alkaryl groups, aralkyl groups and the halogenated derivatives thereof, and the alkoxy derivatives thereof. The alkyl (including cycloalkyl) radicals may be, for example, methyl, ethyl, propyl, chloropropyl, trifluoropropyl, butyl, chlorobutyl, pentyl, hexyl, octyl, octadecyl, cyclobutyl, cyclopentyl, cyclohexyl, cycloheptyl, etc. radicals; monovalent aryl radicals are, for example, phenyl, chlorophenyl, naphthyl, chloronaphthyl, etc.; alkaryl groups are, for example, tolyl, trifluoromethylphenyl, xylyl, methoxyphenyl, etc.; aralkyl groups are, for example, benzyl, phenylethyl, chlorobenzyl, chlorophenylethyl, phenylbutyl, ethoxyphenylbutyl, etc., and the cyanoalkyl groups are, for example, cyanoethyl, cyanopropyl, cyanobutyl, etc. The hydrocarbonoxy and halogenated hydrocarbonoxy radicals included by R are alkoxy groups such as methoxy, ethoxy, propoxy, octadecoxy, octyloxy, chloropropoxy, trifluorobutoxy, chlorohexoxy, etc.; aryloxy groups such as phenoxy, tolyloxy, xylyloxy, chlorophenoxy, fluorophenoxy, chloroxylyloxy, trifluoromethylphenoxy, etc.

The copper-containing objects which can be coated with an insulating coating in accordance with this invention can be pure copper or copper alloys or a metal object or a nonmetallic object containing a copper coating thereon. The copper-containing metal objects can be pure copper, brass and other copper-containing alloys, wherein the alloy comprises at least 50% by weight copper. The term copper-containing object also includes metallic objects and non-metallic objects or plastic objects having a copper or an alloy of copper, containing at least 50% by weight copper, as a coating of the surface of the object. The copper-containing alloys are, for example, brass, bronze, German silver, Muntz metal, red brass, nickel silver, Everdur and the like. The non-metallic or plastic objects containing a copper or copper alloy coated thereon are, for example, polyvinylchloride, Bakelite (a phenol-formaldehyde polymer), Mylar (a polyethyleneterephthalate), polymethylmethacrylate, nylon, melamine-formaldehyde resins, polystyrene, the polycarbonates of dihydric alcohols, etc. It is of course obvious to those skilled in the art that the plastic should be chosen so that it is not melted at the curing temperature of the particular phenol employed. Thus, for example, when the organosilicon-substituted phenols are employed, any plastic having a melting point above about 25° C. would be a satisfactory substrate for the copper coating.

In accordance with the process of this invention, oxygen is essential to the curing of the phenol on the copper-containing object. It is therefore essential that the coated object be exposed to air or an oxygen-containing atmosphere to insure that the reaction takes place and the insoluble insulating coating is obtained.

It is also essential in the process of this invention that as a catalytic material, a pyridine or substituted pyridine be employed in the reaction mixture. Illustrative of the catalytic materials that can be employed are pyridine, α-, β- and γ-picoline, quinoline, isoquinoline, quinaldine, 2-butylpyridine, 2-phenylpyridine, 4-phenylpyridine, lepidine, 5,8-dimethoxylepidine, 2,3-dimethylquinoline, pyrimidine, 2-methoxyethylpyridine, 2-dimethylaminoethylpyridine, phenanthridine, etc.

The amount of the pyridine or substituted pyridine employed as the catalyst in the process of this invention is not critical and can vary by weight from about 0.05 part to 50 parts of the pyridine per 100 parts of the phenol. It is preferred to employ from about 0.1 to 10 parts, by weight, of pyridine per 100 parts by weight of the phenol.

The temperature at which the curing step of the process of this invention is conducted can range from about 20° C. to 300° C. or even higher. With each particular phenol used, it would be relatively easy for one skilled in the art to determine the temperature to be employed in this range. For example, with the silicon-containing materials, a cured coating is obtained at 20–40° C., whereas when 2,6-dimethylphenol is employed, temperatures in the range of about 150° C. are employed and when phenol itself is employed, heating to a temperature of about 100° are usually required in order to obtain the insoluble cured coating on the copper-containing object.

A solvent is not necessary in conducting the process of this invention. However, a solvent is desired for ease of operation and ease of coating the copper objects. The solvents which can be employed in the process of this invention are, for example, benzene, toluene, xylene, acetone, dioxane, tetrahydrofuran, chloroform, carbon tetrachloride, and the like. These solvents are solvents in which the starting materials are soluble and are readily volatilized by slight heating in air.

The process of this invention is useful in producing insulating coatings on copper-containing objects whereby the copper is protected from further corrosion and the like. For example, copper flashing treated in such manner and then exposed to the elements would not undergo the unsightly discoloration which is normal for copper flashing.

Illustrative of the phenols which are included in Formula I are phenol, 2,6-dimethylphenol, Bisphenol-A, 3-chlorophenol, 3-bromophenol, 3-methylphenol, 3-ethylphenol, 3-phenylphenol, 3-chloro-5-ethylphenol, 3,5-dimethylphenol, 3-octadecylphenol, 3,5-dibenzylphenol, 3-naphthylphenol, 3,5-di-(chloropropoxy)phenol, 3-methoxyphenol, 3-decoxy-phenol, 2-methylphenol, 2-ethylphenol, 2-cyclohexylphenol, 2-methoxyphenol, 2,5-dimethylphenol, 2-methoxy-5-ethoxyphenol, 3,4-dimethylphenol, 4-ethoxyphenol, 2,4-dimethylphenol, 2-octodecyl-4-butyl- phenol, 2,6-dipropylphenol, 2,6-diphenylphenol, 2,3,6-trimethylphenol, 2,3,5,6-tetramethylphenol, 2,6-diethoxyphenol, etc.

The organosilicon compounds represented by Formula I where Z is a silicon-containing moiety include arylolsilanes of the formula

VIII

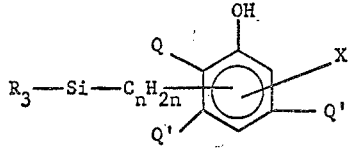

siloxanes of the formula

IX

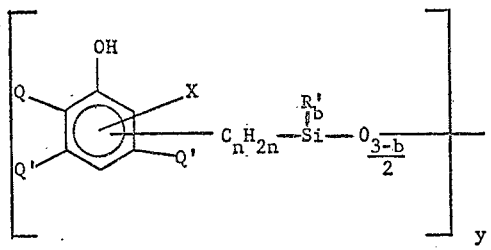

and copolymeric arylolsiloxanes of the formula

X

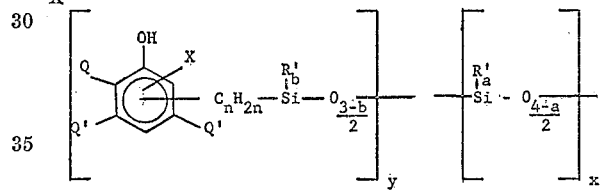

where R, R', Q, Q', X, a, b, n, x and y have the above-defined meanings. These organosilicon compounds are more fully described in my copending application Ser. No. 569,105 (Patent 3,410,820) filed concurrently herewith and assigned to the same assignee as the present invention, which application is made a part hereof by reference.

The following examples serve to further illustrate the invention. All parts are by weight unless otherwise stated.

Example 1

Phenol (0.1 gram) was dissolved in toluene (1 ml.) to which pyridine (0.1 gram) had been added. A copper sheet that had been freshly cleaned in a 50% nitric acid dip was coated with the above solution and then heated slowly to 100° C. and maintained at 100° C. for 2 minutes. A glossy film was produced on the sulface of the copper. This film was insoluble in toluene, acetone, chloroform and benzene.

The same results were obtained when quinoline was substituted for pyridine in the example.

Example 2

In this example, a solution of 2,6-dimethylphenol (0.1 gram) in 1 ml. of toluene to which pyridine (0.1 gram) had been added, was employed. A copper sheet which had been freshly cleaned in a 50% nitric acid dip was coated with this solution and then heated slowly to 150° C. in air and maintained at 150° C. for 2 minutes to yield a polymeric film on the copper sheet, which polymeric film is insoluble in acetone or toluene.

When quinoline was substituted for pyridine in this example, the same results were obtained.

Example 3

In this example, a solution of bis-2,2-(4-hydroxyphenyl)propane in 1 ml. of toluene to which 0.1 gram of pyridine had been added was employed. A copper sheet which had been previously cleaned by dipping in a 50% nitric acid dip was coated with this solution. The copper sheet was then heated at 200° for 5 minutes in air to produce a tough, insoluble polymeric film. When it was attempted to cure this coating on aluminum or stainless steel, no polymeric film was produced, thus illustrating the specificity of this process for copper-containing metallic objects.

When quinoline was substituted for pyridine in this example, the same results were obtained.

Example 4

Organopolysiloxane compositions having the following average formulas were employed in this example. These organosilicon compounds were prepared in accordance with the procedures set forth in Examples 3 to 9 of my aforementioned application, Ser. No. 569,105 (Patent 3,410,820), filed concurrently herewith.

XI 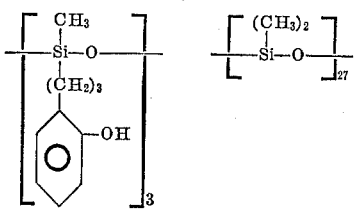

XVIII

XII 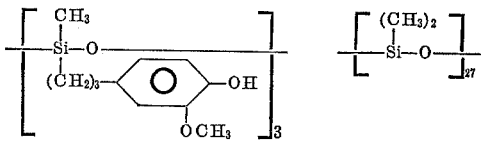

XIII 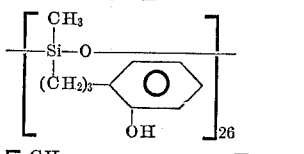

XIV 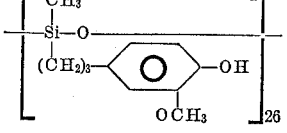

XV 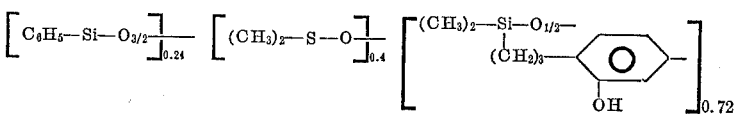

XVI 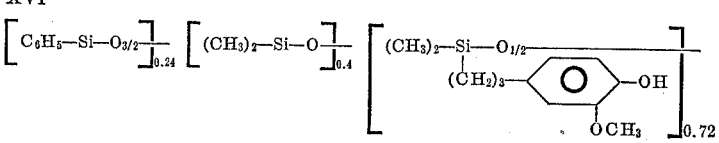

XVII 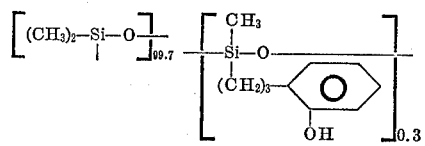

The organopolysiloxane compositions were each dissolved in acetone with a ratio of 1 volume of the composition to 4 volumes of acetone. This solution was then applied as a thin coat to a piece of 2" by 1" copper sheet. The coated copper sheet was placed in a beaker and excess solution allowed to drain onto filter paper. Pyridine was brought into contact with the reaction zone in two ways. In Method A the pyridine was added to the acetone solution prior to the application. In Method B the pyridine was introduced as a vapor by soaking the filter paper with pyridine and allowing the pyridine to vaporize onto the coated metal sheet. In each instance the compositions in the presence of the pyridine compounds cured to a hard, glossy, insoluble film within 15 minutes at room temperature. The cure was slightly faster when the pyridine was added by Method A, as compared to Method B. The quality of the film, however, was better with Method B, that is, the film adhered better to the copper plate and was less colored. When brass sheet was employed in place of copper sheet, in accordance with this procedure, a cured insulating film was also obtained on the brass. However, when stainless steel and aluminum were employed, no cure was obtained.

Example 5

For this example, the silyl ester of Bisphenol-A was employed. The silyl ester of Bisphenol-A has the formula

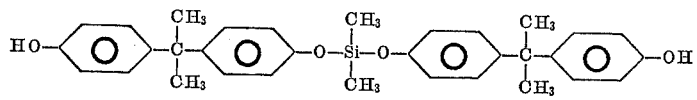

This silyl ester was prepared by reacting 2 moles of Bisphenol-A with 1 mole of dimethyldichlorosilane in the presence of pyridine (2 moles of pyridine per mole of the dimethyldichlorosilane), employing toluene as a solvent in the ratio of 40 moles of toluene per mole of bisphenol-A. The insoluble pyridine hydrochloride was filtered off. The toluene solution of the silyl ester which contained residual pyridine, was applied to a clean copper sheet, and the copper sheet heated slowly to 200° C. in air, to produce a tough, insoluble polymeric film on the copper.

By the substitution of other dichlorosilanes such as phenylmethyldichlorosilane, diethyldichlorosilane, naphthylmethyldichlorosilane, methylvinyldichlorosilane, cyclohexenylmethyldichlorosilane, etc., on the dimethyldichlorosilane in this example, one can prepare a large number of esters of Bisphenol-A and dichlorosilanes which can be cured to insoluble polymeric coatings on copper articles by the method of this example.

Example 6

In this example, the adipyl ester of Bisphenol-A having the formula

XIX 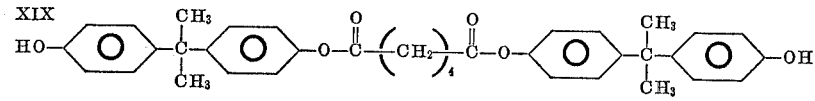

was employed. The adipyl ester was prepared by reacting 2 moles of Bisphenol-A with 1 mole of adipyl chloride in the presence of pyridine and employing toluene as the solvent. There was employed 40 moles of toluene per mole of Bisphenol-A and 2 moles of pyridine per mole of the adipyl chloride. The reaction was conducted by adding the adipyl chloride to the toluene solution of Bisphenol-A and pyridine, with stirring. The insoluble pyridine hydrochloride produced was filtered off and the solution concentrated by evaporation to approximately 50% solids content. The resulting solution which contained the adipyl ester of Bisphenol-A of the Formula XIX and pyridine was coated on a copper sheet and heated slowly to 200° in air, resulting in an insoluble polymeric film on the copper sheet.

By substituting other acid chlorides such as oxalyl chloride, malonyl chloride, succinyl chloride, etc., for the adipyl chloride, one can prepare a number of esters of Bisphenol-A which can be employed in accordance with the procedure of this example to yield pure, polymeric, insoluble coatings on copper articles.

It will, of course, be apparent to those skilled in the art that in addition to the pyridines and phenols given above, other substituted pyridines and other phenols within the scope of Formula I may be employed without departing from the scope of the invention.

What I claim as new and desire to secure by Letters Patent of the United States is:

1. A method of applying a protective coating onto a copper-containing article comprising copper articles, articles made of a copper alloy containing at least 50% by weight copper, metallic articles coated with copper, or a copper alloy containing at least 50% by weight copper, non-metallic articles coated with copper or a copper alloy containing at least 50% by weight copper, which comprises (1) applying to said copper-containing article a coating of a phenol of the formula

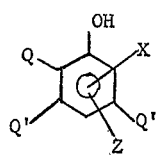

in the presence of a catalyst selected from the class consisting of pyridine and pyridine derivatives and (2) exposing the resulting coated copper-containing article to air or an oxygen-containing atmosphere and maintaining said coated copper-containing article at a temperature at which said phenol reacts with the oxygen of the air to produce an insulated coating on said copper-containing article, wherein X is a substituent selected from the group consisting of hydrogen, chlorine, bromine and iodine, Q is a monovalent substituent selected from the group consisting of hydrogen, hydrocarbon radicals, hydrocarbonoxy radicals, halohydrocarbon radicals having at least 2 carbon atoms between the halogen and the phenol nucleus and halohydrocarbonoxy radicals having at least 2 carbon atoms between the halogen atom and the phenol nucleus, Q' is the same as Q and in addition halogen, Z is the same as Q and in addition halogen or a silicon-containing moiety selected from the group consisting of

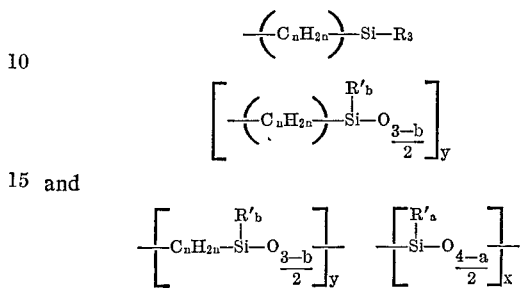

wherein R is a member selected from the class consisting of monovalent hydrocarbon radicals, halogenated monovalent hydrocarbon radicals, cyanoalkyl radicals, hydrocarbonoxy radicals, halogenated hydrocarbonoxy radicals, and groups of the formula

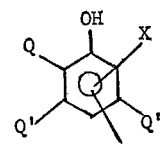

where Q, Q' and X have the above-identified meanings, R' is a member of the group consisting of monovalent hydrocarbon radicals, halogenated monovalent hydrocarbon radicals and cyanoalkyl groups, $a$ is an integer having a value of from 1 to 3, $b$ is an integer having a value of from 0 to 2, and $n$ is an integer having a value of from 0 to 18, $x$ and $y$ are integers of at least 1.

2. A method as claimed in claim 1 wherein said phenol has the formula $C_6H_5$—OH.

3. The method as claimed in claim 1 wherein said phenol is Bisphenol-A.

4. The method as claimed in claim 1 wherein said phenol is 2,6-dimethylphenol.

5. The method as claimed in claim 1 wherein said phenol has the formula

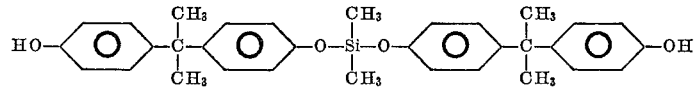

6. The method as claimed in claim 1 wherein said phenol has the formula

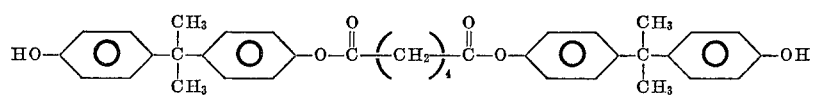

7. The method as claimed in claim 1 wherein said phenol has units of the formula

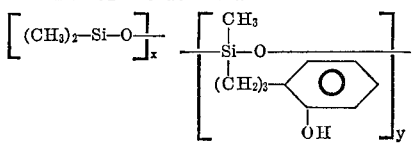

wherein $x$ and $y$ are integers.

8. The method as claimed in claim 1 wherein said phenol has units of the formula

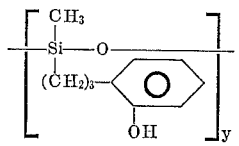

wherein y is an integer.

9. The method as claimed in claim 1 wherein said phenol has units of the formula

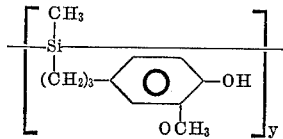

wherein y in an integer.

References Cited

UNITED STATES PATENTS

| 1,433,226 | 10/1922 | Porter | 148—6.14 |
| 1,888,457 | 11/1932 | Gann et al. | 148—6.14 |
| 2,073,783 | 3/1937 | Corkery | 148—6.14 X |
| 3,306,875 | 2/1967 | Hay | 260—30.2 X |

FOREIGN PATENTS

| 249,484 | 8/1927 | Great Britain. |
| 930,993 | 7/1963 | Great Britain. |

WILLIAM D. MARTIN, *Primary Examiner.*

H. J. GWINNELL, *Assistant Examiner.*

U.S. Cl. X.R.

117—132, 135.1, 71, 49